(12) United States Patent
Widergren

(10) Patent No.: US 10,812,689 B2
(45) Date of Patent: Oct. 20, 2020

(54) PERSONAL DISPLAY HEADSET FOR MITIGATING USER ACCESS TO DISALLOWED RESOURCES

(71) Applicant: Veritaz Inc., Hayward, CA (US)

(72) Inventor: Jeffrey Brooks Widergren, Morgan Hill, CA (US)

(73) Assignee: VERITAZ INC., Hayward, CA (US)

( * ) Notice: Subject to any disclaimer, the term of this patent is extended or adjusted under 35 U.S.C. 154(b) by 0 days.

(21) Appl. No.: 16/103,974

(22) Filed: Aug. 16, 2018

(65) Prior Publication Data

US 2019/0058816 A1 Feb. 21, 2019

Related U.S. Application Data

(60) Provisional application No. 62/546,383, filed on Aug. 16, 2017.

(51) Int. Cl.
| | |
|---|---|
| *H04N 5/225* | (2006.01) |
| *H04R 1/10* | (2006.01) |
| *G06F 3/147* | (2006.01) |
| *H04N 5/247* | (2006.01) |
| *H04N 5/232* | (2006.01) |

(Continued)

(52) U.S. Cl.
CPC ........... *H04N 5/2253* (2013.01); *G06F 3/147* (2013.01); *H04N 5/2257* (2013.01); *H04N 5/23238* (2013.01); *H04N 5/247* (2013.01); *H04R 1/1008* (2013.01); *H04R 1/1041* (2013.01);

(Continued)

(58) Field of Classification Search
CPC .... G06F 3/147; H04N 5/2252; H04N 5/2253; H04N 5/2257; H04N 5/23238; H04N 5/247; H04R 1/1008; H04R 1/1041; H04R 5/027; H04R 5/033

See application file for complete search history.

(56) References Cited

U.S. PATENT DOCUMENTS

| | | | |
|---|---|---|---|
| 5,696,521 A * | 12/1997 | Robinson | G02B 27/017 345/8 |
| 10,057,674 B1 * | 8/2018 | Tseng | H04R 1/1041 |

(Continued)

OTHER PUBLICATIONS

Young, Lee W., Notification of Transmittal of the International Search Report and the Written Opinion of the International Search Authority, or the Declaration, dated Dec. 13, 2018, 10 pages, PCT/US2018/46800, Alexandria, VA.

*Primary Examiner* — Amy R Hsu
(74) *Attorney, Agent, or Firm* — Stetina Brunda Garred and Brucker

(57) ABSTRACT

There is provided a personal display headset for use upon a head of a user. The headset includes a user video display to display images viewable by the user with the headset worn upon the head adjacent a face of the user. The headset includes a display chamber defined by the user video display and the face of the user upon the headset being worn by the user. The headset includes headphones that have first and second ear cups, a first speaker disposed within the first ear cup, and a second speaker disposed within the second ear cup. A variety of electronic components may be included in the display chamber, in the ear cups and about the headset to mitigate against the user accessing unapproved resources. The headset may also be used in conjunction with an input device. Methods of use of the headset and input device are also provided.

32 Claims, 4 Drawing Sheets

(51) Int. Cl.
*H04R 5/033* (2006.01)
*H04R 5/027* (2006.01)

(52) U.S. Cl.
CPC ............ *H04N 5/2252* (2013.01); *H04R 5/027* (2013.01); *H04R 5/033* (2013.01)

(56) References Cited

U.S. PATENT DOCUMENTS

| | | | |
|---|---|---|---|
| 2013/0083933 A1* | 4/2013 | Aase | H04R 1/1091 |
| | | | 381/58 |
| 2013/0237146 A1* | 9/2013 | Serota | H04M 1/05 |
| | | | 455/12.1 |
| 2014/0146976 A1 | 5/2014 | Rundle | |
| 2014/0161412 A1* | 6/2014 | Chase | H04N 5/77 |
| | | | 386/224 |
| 2015/0338915 A1* | 11/2015 | Publicover | H04W 12/0605 |
| | | | 345/633 |
| 2016/0238842 A1* | 8/2016 | Sendai | H04R 1/326 |
| 2016/0282618 A1* | 9/2016 | Kon | G06F 3/011 |
| 2016/0366507 A1* | 12/2016 | Hou | H04R 1/1041 |
| 2017/0104928 A1* | 4/2017 | Chase | H04N 5/77 |
| 2017/0213471 A1* | 7/2017 | Breed | G09B 7/07 |
| 2018/0003986 A1* | 1/2018 | Guo | H04R 5/0335 |
| 2018/0050800 A1* | 2/2018 | Boykin | B60L 53/14 |
| 2018/0160097 A1* | 6/2018 | Weng | H04N 13/344 |
| 2018/0164876 A1* | 6/2018 | Smit | G06F 3/04815 |
| 2018/0192228 A1* | 7/2018 | Woelfl | G10K 11/17815 |
| 2019/0025588 A1* | 1/2019 | Osterhout | G02B 27/0172 |
| 2019/0066630 A1* | 2/2019 | Fukazawa | G06F 3/14 |

\* cited by examiner

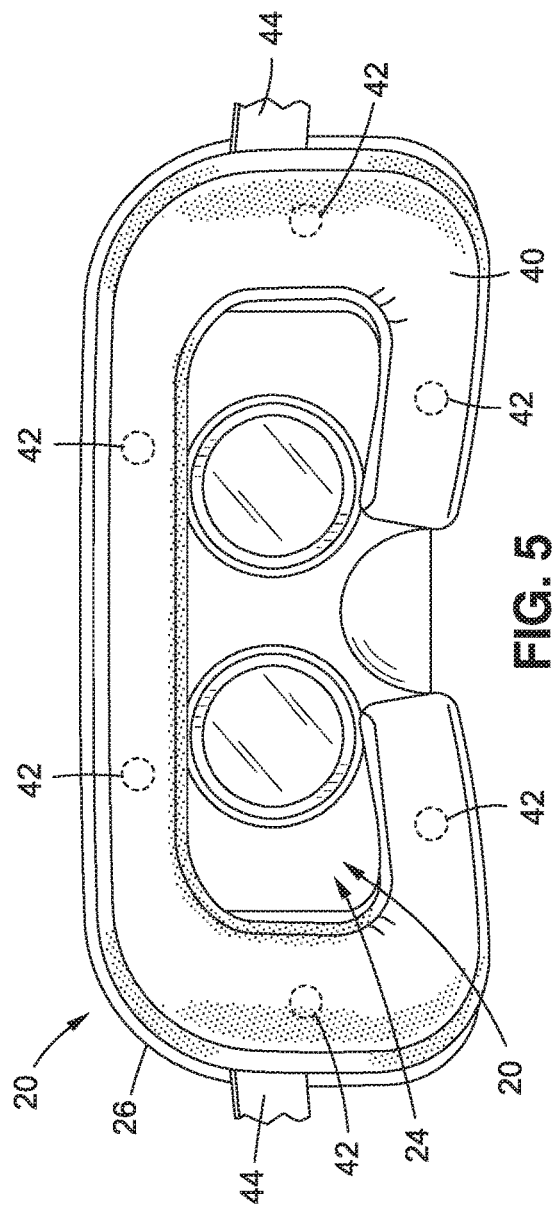
FIG. 5
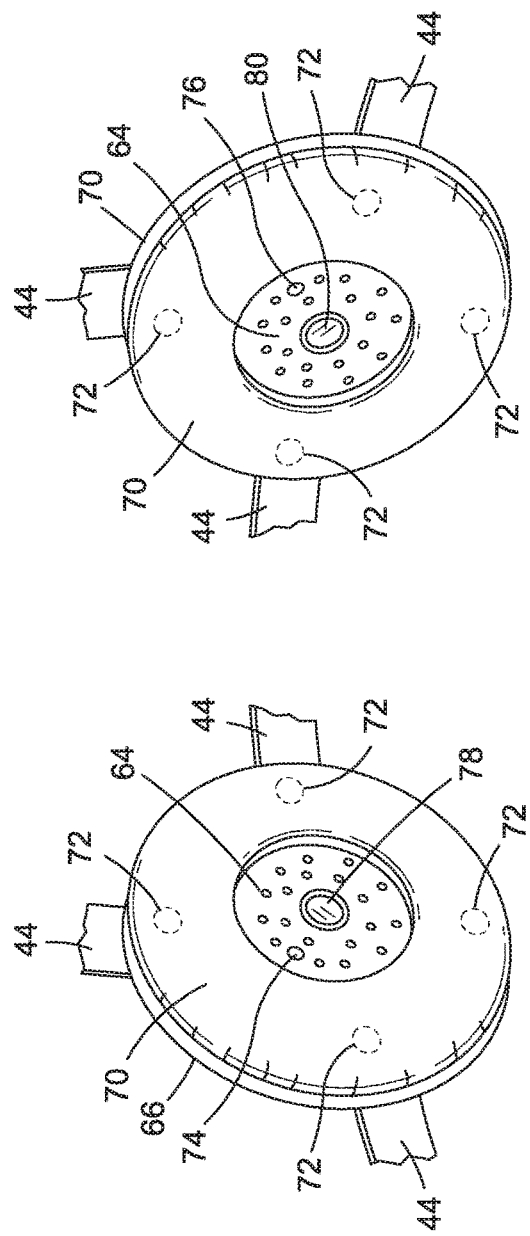
FIG. 6A
FIG. 6B

PERSONAL DISPLAY HEADSET FOR MITIGATING USER ACCESS TO DISALLOWED RESOURCES

CROSS-REFERENCE TO RELATED APPLICATIONS

This non-provisional patent application claims priority to and the benefits of U.S. Provisional Patent Application Ser. No. 62/546,383, entitled SYSTEM TO PREVENT USERS' ACCESS TO DISALLOWED (CHEATING) RESOURCES DURING A SOFTWARE ACTIVITY WHICH REQUIRES CHEATING PREVENTION, LIKE ONLINE TESTING OR GAMBLING, filed on Aug. 16, 2017, the entire contents of which are herein incorporated by reference.

STATEMENT RE: FEDERALLY SPONSORED RESEARCH/DEVELOPMENT

Not Applicable

BACKGROUND

1. Technical Field

The present disclosure relates generally to a personal display system that includes a personal display headset. More particularly, the present disclosure relates to a personal display headset with a view display and earphones for mitigating access to unauthorized resources and related methods of utilizing the same.

2. Related Art

An important activity which requires cheating prevention is online scholastic testing. In the US, a significant amount of classes are taken online. However, only a fraction of those online classes employ companies who try to "catch" cheaters by remote proctoring via the student test taker's webcam. The rest of online testing is essentially unmonitored. This is basically allowing the "teacher to leave the room" for most online testing, thereby devaluing course grades and any related certificate or degree. Even with remote proctoring using a webcam based monitoring system, such architecture is quite limited in its effectiveness in mitigating cheating. The problem is that there is not enough information conveyed through a webcam which would only provide a view of the test taker's head, upper torso, and upper arms. There are many ways to circumvent this simple system architecture with the test taker having improper access to unapproved resources.

An area in which the industry simply lives with the cheating is online gambling. This is a multi-billion-dollar industry in need for a solution to cheating. Cheaters have an unfair advantage over players and/or the house by using computer simulators or multiple chairs at a table (i.e., a single individual remoting participating as more than one player in an online multi-player gambling game). Examples of such games involved are typical for physical casinos, such as poker, blackjack, roulette, baccarat, Pal Gow, etc.

A slight variation on gambling are games of skill. Games of skill may include chess, bridge, checkers, etc. Currently, tournaments involving money for such games are only held in person because of the inability to effectively stop cheating while playing online. For example, a remote player may have improper access to computer simulators during game play.

Because conventional approaches for mitigating online cheating or access to disallowed resource when engaging in certain online or remote activities are deficient for a variety of reasons as noted above, there is a need in the art for an improved system and method in comparison to the prior art.

BRIEF SUMMARY

In accordance with one embodiment of the present disclosure, there is provided a personal display headset for use upon a head of a user. The headset includes a user video display sized and configured to display images viewable by the user with the headset worn upon the head adjacent a face of the user. The headset further includes a display chamber defined by the user video display and the face of the user upon the headset being worn by the user. The headset further includes headphones. The headphones include first and second ear cups, a first speaker disposed within the first ear cup, a second speaker disposed within the second ear cup, a first internal microphone disposed within the first ear cup, and a second internal microphone disposed within the second ear cup.

According to various embodiments, the personal display headset may further include a first internal camera disposed within the first ear cup, and a second internal camera disposed within the second ear cup. The headphones may further include ear cup pads. The ear cup pads are distributed about each of the first and second ear cups between the first and second ear cups and the head of the user for sealing the headphones with the head of the user. The ear cup pads include ear cup pad sensors sized and configured to detect contact between the headset and the head of the user. The ear cup pad sensors may be pressure sensors. The personal display headset may further include a view camera disposed external to the display chamber and facing generally away from the user and the user video display.

According to another embodiment, there is provided a personal display headset for use upon a head of a user. The headset includes a user video display sized and configured to display images viewable by the user with the headset worn upon the head adjacent a face of the user. The headset further includes a display chamber defined by the user video display and the face of the user upon the headset being worn by the user. The headset further includes headphones. The headphones include first and second ear cups, a first speaker disposed within the first ear cup, a second speaker disposed within the second ear cup, a first internal camera disposed within the first ear cup, and a second internal camera disposed within the second ear cup. The headphones may further include ear cup pads. The ear cup pads are distributed about each of the first and second ear cups between the first and second ear cups and the head of the user for sealing the headphones with the head of the user. The ear cup pads include ear cup pad sensors sized and configured to detect contact between the headset and the head of the user. The ear cup pad sensors may be pressure sensors. The headset may further include a view camera disposed external to the display chamber and facing generally away from the user and the user video display.

According to another embodiment, there is provided a personal display headset for use upon a head of a user. The headset includes a user video display sized and configured to display images viewable by the user with the headset worn upon the head adjacent a face of the user. The headset further includes a display chamber defined by the user video display and the face of the user upon the headset being worn by the user. The headset further includes a first display chamber camera disposed within the display chamber facing away from the user to capture images of the user video display. The headset further includes headphones. The headphones include first and second ear cups, a first speaker disposed within the first ear cup; and a second speaker disposed within the second ear cup.

According to various embodiments, the personal display headset may further include display pads distributed about the user video display between the user video display and the face of the user for sealing the display chamber with the face of the user. The display pads include display pad sensors sized and configured to detect contact between the headset and the face of the user. The display pad sensors may be pressure sensors. The personal display headset may further include a second display chamber camera disposed within the display chamber facing away from the user video display towards the face of the user to capture images of the user. The personal display headset may further include a view camera disposed external to the display chamber and facing generally away from the user and the user video display. The headphones may further include ear cup pads. The ear cup pads are distributed about each of the first and second ear cups between the first and second ear cups and the head of the user for sealing the headphones with the head of the user. The ear cup pads include ear cup pad sensors sized and configured to detect contact between the headset and the head of the user. The ear cup pad sensors may be pressure sensors.

According to yet another embodiment, there is provided a personal display headset for use upon a head of a user. The headset includes a user video display sized and configured to display images viewable by the user with the headset worn upon the head adjacent a face of the user. The headset further includes a display chamber defined by the user video display and the face of the user upon the headset being worn by the user. The headset further includes a first display chamber camera disposed within the display chamber facing away from the user to capture images of the user video display. The headset further includes display pads distributed about the user video display between the user video display and the face of the user for sealing the display chamber with the face of the user. The display pads include display pad sensors sized and configured to detect contact between the headset and the face of the user. The headset further includes headphones. The headphones include first and second ear cups. The headphones further include ear cup pads distributed about each of the first and second ear cups between the first and second ear cups and the head of the user for sealing the headphones with the head of the user. The ear cup pads include ear cup pad sensors sized and configured to detect contact between the headset and the head of the user. The headphones further include a first speaker disposed within the first ear cup. The headphones further include a second speaker disposed within the second ear cup.

According to various embodiments, the personal display headset may further include a second display chamber camera disposed within the display chamber facing away from the user video display towards the face of the user to capture images of the user. The personal display headset may further include a view camera disposed external to the display chamber and facing generally away from the user and the user video display.

According to another embodiment, there is provided a personal display system for use upon a head of a user. The system includes a computer processing unit. The system further includes a headset including a user video display sized and configured to display images viewable by the user with the headset worn upon the head adjacent a face of the user. The user video display is in electronic communication with the computer processing unit. The system further includes a display chamber defined by the user video display and the face of the user upon the headset being worn by the user. The system further includes a view camera disposed external to the display chamber and facing generally away from the user video display. The view camera is disposed in electronic communication with the computer processing unit. The system further includes a light source disposed exterior to the display chamber and sized and configured to selectively emit light. The light source is in electronic communication with the computer processing unit. The system further includes a terminal. The terminal includes a terminal display, an input device in electronic communication with the computer processing unit configured to receive input from the user for transmission to the computer processing device, and a light sensor sized and configured to detect light emissions from the light source, the light sensor being in electronic communication with the computer processing unit. The input device may include a keyboard. The light sensor may be a video camera.

According to another embodiment, there is provided a method of a user interacting with an input terminal. The method includes providing a headset to the user. The headset includes a user video display sized and configured to display images viewable by the user with the headset worn upon the head adjacent a face of the user. The user video display is in electronic communication with a computer processing unit. The headset further includes display pads distributed about the user video display between the user video display and the face of the user for sealing the display chamber with the face of the user. The display pads include display pad sensors sized and configured to detect contact between the headset and the face of the user. The headset further includes a display chamber defined by the user video display and the face of the user upon the headset being worn by the user. The headset further includes a view camera disposed external to the display chamber and facing generally away from the user video display. The view camera is disposed in electronic communication with the computer processing unit. The method further includes providing the input terminal. The input terminal includes an input device in electronic communication with the computer processing unit configured to receive input from the user for transmission to the computer processing unit, and a terminal camera in electronic communication with the computer processing unit. The method further includes receiving, at the central processing unit from the display pad sensors, a signal indicating contact between the headset and the face of the user. The method further includes receiving, at the central processing unit from the terminal camera, a video image of the headset on the user. The method further includes receiving at the central processing unit from the view camera a video image of the input terminal. The method further includes displaying on the user video display the received video image of the input terminal. The method further includes receiving at the central processing unit an input by the user via the input device. The headset further include a first display chamber camera disposed within the display chamber facing away from the user to capture images of the user video display. The method further includes receiving, at the central processing unit from the first display chamber camera, a video image of the input terminal as displayed on the user video display.

According to various embodiment, the headset may further include a second display chamber camera disposed within the display chamber facing away from the user video display towards the face of the user to capture images of the user. The method may further include receiving, at the central processing unit from the second display chamber camera, a video image of the user. The headset may further include first and second ear cups, a first speaker disposed within the first ear cup, a second speaker disposed within the second ear cup, a first internal microphone disposed within the first ear cup, a second internal microphone disposed within the second ear cup, a first internal microphone disposed within the first ear cup, and a second internal microphone disposed within the second ear cup. The method may further include receiving at the central processing unit from each of the first and second internal microphones an audio signal respectively related to sounds from within the first and second ear cups. The headset may further include a first internal camera disposed within the first ear cup, and a second internal camera disposed within the second ear cup. The method may further include receiving at the central processing unit from each of the first and second internal cameras a video image respectively related to the first and second ear cups. The headset may further include ear cup pads distributed about each of the first and second ear cups between the first and second ear cups and the head of the user for sealing the headphones with the head of the user. The ear cup pads include ear cup pad sensors sized and configured to detect contact between the headset and the head of the user. The method may further include receiving, at the central processing unit from each of the ear cup pad sensors, signals indicating contact between the headset and the head of the user.

According to another embodiment, there is provided a method of a user interacting with an input terminal. The method includes providing a headset to the user. The headset includes a user video display sized and configured to display images viewable by the user with the headset worn upon the head adjacent a face of the user. The user video display is in electronic communication with a computer processing unit. The headset further includes a display chamber defined by the user video display and the face of the user upon the headset being worn by the user. The headset further includes a view camera disposed external to the display chamber and facing generally away from the user video display. The view camera is disposed in electronic communication with the computer processing unit. The method further includes providing the input terminal including an input device in electronic communication with the computer processing unit configured to receive input from the user for transmission to the computer processing unit, and a terminal camera in electronic communication with the computer processing unit. The method further includes receiving at the central processing unit from the terminal camera a video image of the headset on the user. The method further includes receiving at the central processing unit from the view camera a video image of the input terminal. The method further includes identifying the input terminal in the received video image from the view camera. The method further includes filtering video content of the video image from the view camera based upon the identified input terminal. The method further includes displaying on the user video display the filtered image of the input terminal. The input terminal may be a first color, and the step of identifying the input terminal is based upon detection of the first color. The input terminal may include a terminal camera in electronic communication with the computer processing unit. The method may further include the step of receiving at the central processing unit from the terminal camera a video image of the headset on the user.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 5 is a rear view of a user video display and display pads of a portion of the personal display headset;

FIG. 6A is a perspective view of a left ear cup and straps of a portion of the personal display headset; and FIG. 6B is a perspective view of a right ear cup and straps of a portion of the personal display headset.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
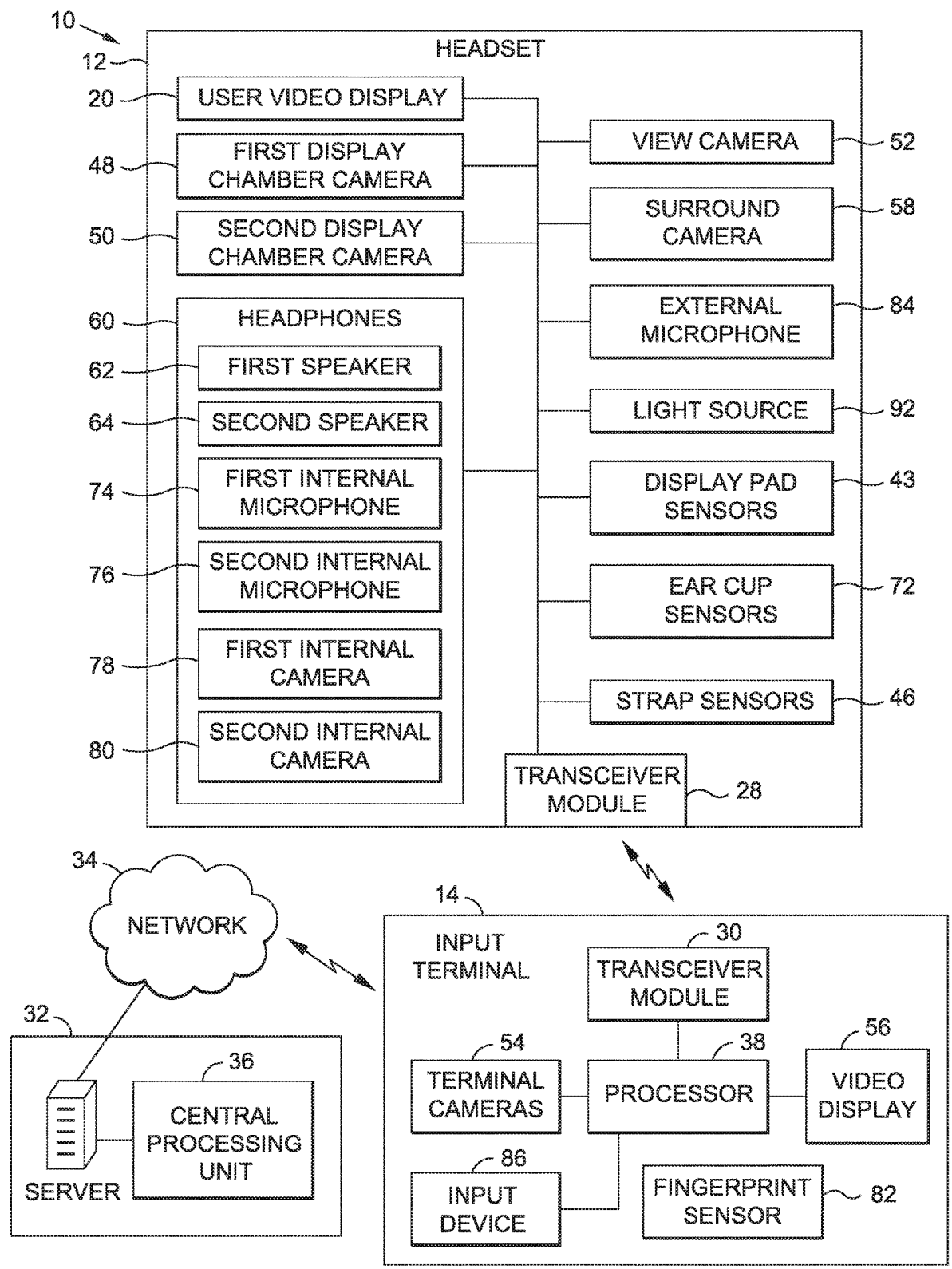
FIG. 1 is a symbolic schematic diagram showing the various components of a personal display system that includes a personal display headset, an input terminal and remote connectivity to an online server.
Figure 2:
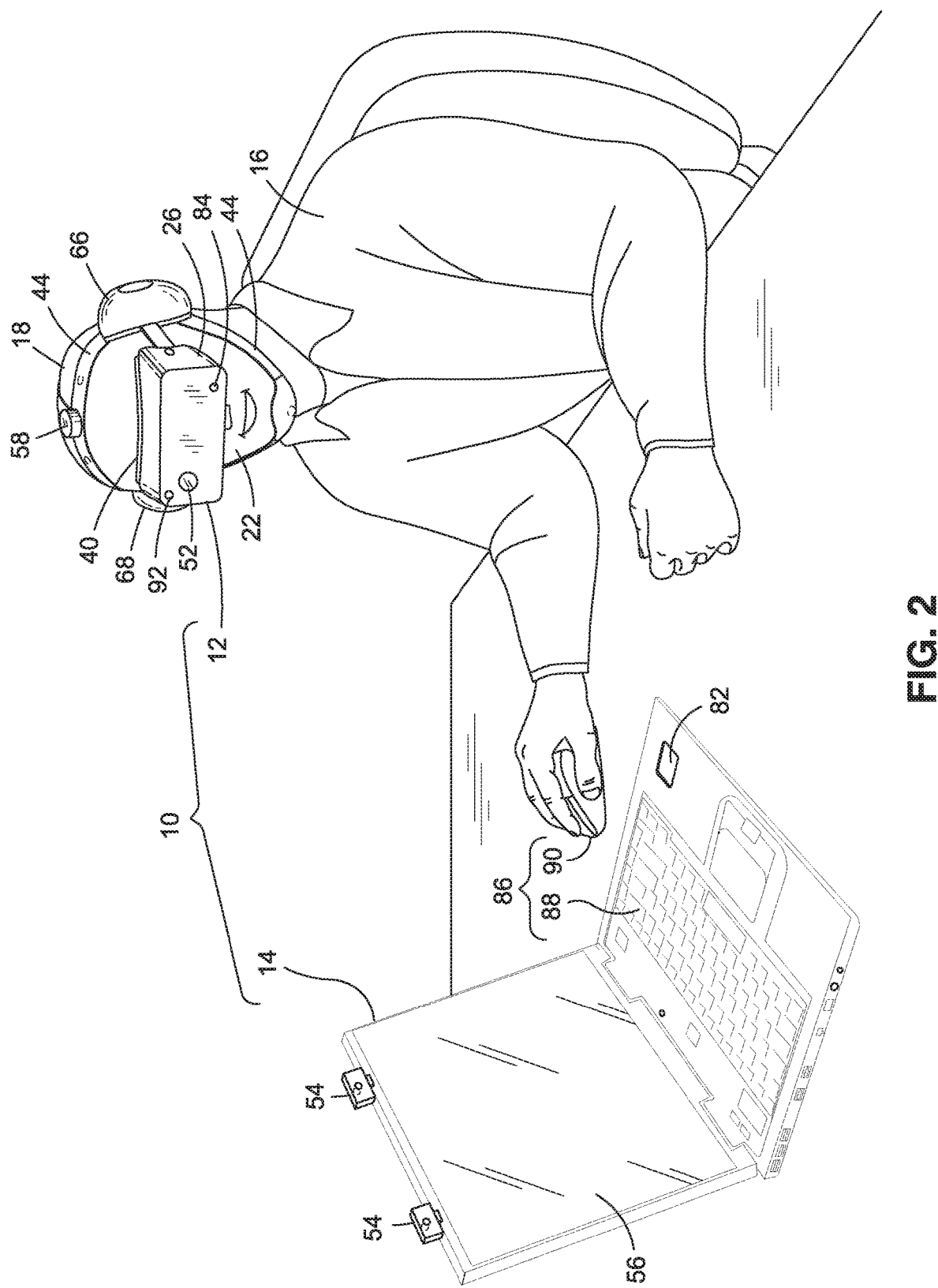
FIG. 2 is an exemplary perspective view of a user wearing the personal display headset and interacting with the input terminal.
Figure 3:
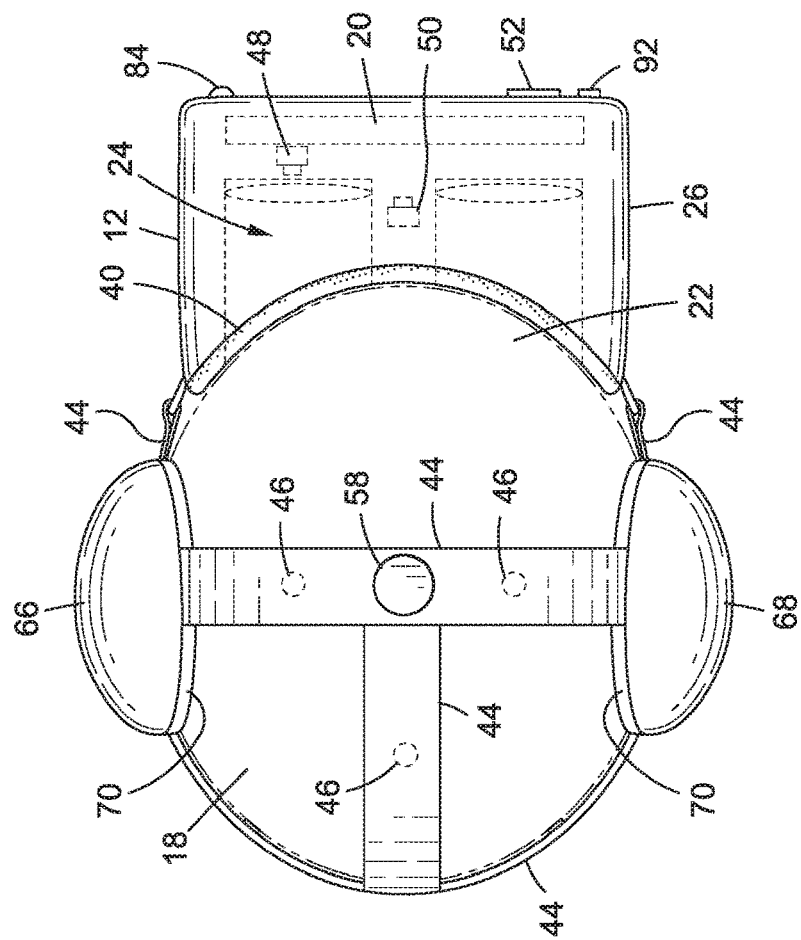
FIG. 3 is a front view of a head of the user wearing the personal display headset.
Figure 4:
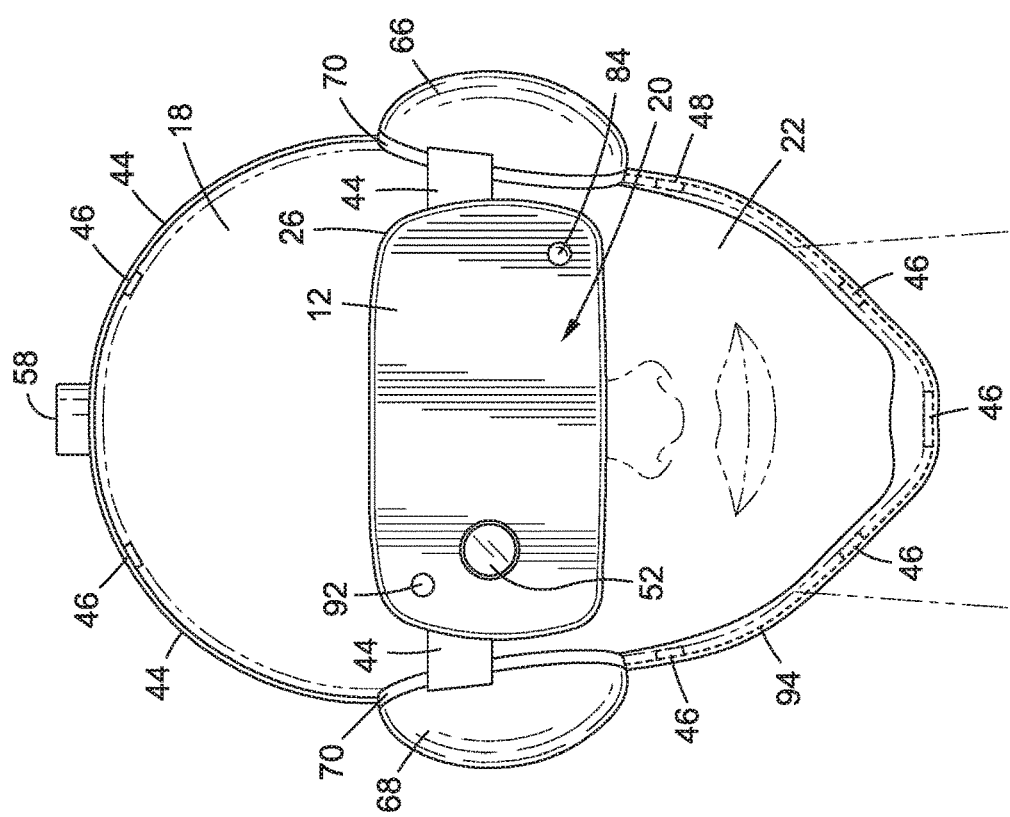
FIG. 4 is a top view of the head of the user wearing the personal display headset.

Referring now to FIG. 1 there is depicted a symbolic schematic diagram showing the various components of a personal display system 10 that includes a personal display headset 12 and an input terminal 14. Referring additionally to FIG. 2, there is depicted an exemplary perspective view of a user 16 wearing the personal display headset 12 and interacting with the input terminal 14. FIG. 3 depicts a front view of a head 18 of the user 16 wearing the personal display headset 12. FIG. 4 depicts a top view of the head 18 of the user 16 wearing the personal display headset 12. The personal display headset 12 includes a user video display 20. The user video display 20 is sized and configured to display images viewable by the user 16 with the personal display headset 12 worn upon a head 18 adjacent a face 22 of the user 16. The personal display headset 12 further includes a display chamber 24 (as best viewed from the top view of FIG. 4). The display chamber 24 is defined by the user video display 20 and the face 22 of the user 16 upon the personal display headset 12 being worn by the user 16. The headset 12 may further include a display chamber housing 26 that supports the user video display 20 and further defines the display chamber 24. FIG. 5 is a rear view of a user video display 20 of a portion of the personal display headset 12.

An aspect of the present invention relates to physically limiting what the user 16 may see. This focuses the user's attention on the user video display 20. In addition, the user 16 is intended to only be able to view the displayed content on the user video display 20 so as to mitigate the ability of the user 16 to view unauthorized resources or be exposed to external stimuli. In a test taking, gaming and gambling environments, such unauthorized resources would be any external content that may aid the user 16, such as notes, another video display or screen, or other output device that is not permitted under the applicable test, game or gambling parameters. In such context, the present invention helps to limit the ability to cheat and may be implemented as an anti-cheating system.

Another application could include circumstances where the user 16 is required to perform some task without the aid of unauthorized materials, such as a student required to write/type/author a paper. Another application could include circumstances where the user 16 is required to perform some task and is expected to maintain focus on the content being presented by the user display headset 12, such as a live stream, or video of a required lecture or tutorial.

In the embodiment depicted, the personal display headset 12 includes a variety of components and features. However, it is understood that according to various other embodiments of the invention, various combinations or subsets of such components and features may only be utilized.

The personal display headset 12 may be electronically connected to the input terminal 14. Such connectivity may be wireless or hardwired. The hardware/software and techniques for effecting such connectivity may be chosen from those which are well known to one of ordinary skill in the art. In this regard, the personal display headset 12 may include a transceiver module 28 that is configured to wirelessly connect to a corresponding transceiver module 30 included in the input terminal 14.

In the exemplary computing environment, a remote server 30 is utilized. The remote server 32 may connect to the input terminal 14 via a computer network 34, such as the Internet. The remote server 32 may include a central processing unit 36 and related database storage resources. The central processing unit 36 may be configured to control, analyze, process and send and receive the various electronic signals, images, audio signals, image signals, video streams and control commands as interacting with the personal display headset 12 and the input terminal 14 as discussed in further detail below. Further, the input terminal 14 may include a processor 36 which may also interact with and/or otherwise pre-process or post-process the various electronic signals, images, audio signals, video streams and control commands as interacting with the personal display headset 12 and the input terminal 14. The hardware/software and techniques for effecting such processing may be chosen from those which are well known to one of ordinary skill in the art. The various computing and processing functions of the central processing unit 34 may be effected remotely as indicated in the distributed computing environment depicted. However, it is understood that any of such computing processing functions may be effected entirely locally, such as at the processor 36 of the input terminal 14 and/or onboard the personal display headset 12.

The personal display headset 12 may take the form of VR type googles. However, the user video display 20 may display content of a 3D or 2D nature as may be needed. The display chamber housing 26 may be formed of a semi-rigid material, such as a flexible plastic, rubber, or polymer material, such as a silicon rubber.

The personal display headset 12 may further include display pads 40 distributed about the user video display 20 between the user video display 20 and the face 22 of the user 16 for sealing the display chamber 24 with the face 22 of the user 16. The display pads 40 include display pad sensors 42 sized and configured to detect contact between the personal display headset 12 and the face 22 of the user 16. The display pad sensors 42 may be pressure sensors. The display pad sensors 42 are electronically connected to the central processing unit 36. In this regard, the central processing unit 36 may receive from the display pad sensors 42 a signal indicating contact between the headset 12 and the face 22 of the user 16. The goal of this arrangement is to seek to have the personal display headset 12 secured in place in a manner that does not allow for the possibility of any gap between the face 22 of the user 16 and the display pads 40. Such a gap could be exploited to facilitate the user 16 to gain visual access to unauthorized resources external to the personal display headset 12 (i.e., the user 16 cheating by seeing disallowed materials). The hardware/software and techniques for effecting such signal generation, transmission and processing may be chosen from those which are well known to one of ordinary skill in the art.

The personal display headset 12 may include a variety of headset straps 44. The headset straps 44 are used to facilitate a secure fit of the personal display headset 12 as worn by the user 16 about the head 18, the face 22, and chin of the user 16. The number of straps, sizing, configuration, material types, and adjustability may be chosen from those selections which are well known to one of ordinary skill in the art. The strap sensors 46 are electronically connected to the central processing unit 36. The central processing unit 36 may receive from the strap sensors 46 a signal indicating contact between the headset 12 and the head 18 of the user 16. This arrangement further ensures that the user 16 is properly wearing the personal display headset 12 at all relevant times. The hardware/software and techniques for effecting such signal generation, transmission and processing may be chosen from those which are well known to one of ordinary skill in the art.

It is contemplated that the personal display headset 12 is intended to physically limit the ability of user 16 to see anything outside of the software activities (such as testing, gambling, etc.) as visually displayed on the user video display 20. Such limitations are structured so as to seek to eliminate cheating during such activities through exposure to unauthorized resources.

The personal display headset 12 may include a first display chamber camera 48 (as depicted in FIG. 4). The first display chamber camera 48 is disposed within the display chamber 24 facing away from the user video display 20 towards the face 22 of the user 16 to capture images of the user 16 and the environment within the display chamber 24. The first display chamber camera 48 is configured to generate and transmit an image signal to the central processing unit 36. The central processing unit 36 is configured to receive the image signal from the first display chamber camera 48. The hardware/software and techniques for effecting such image signal generation, transmission and processing may be chosen from those which are well known to one of ordinary skill in the art. A low light camera would be appropriate.

In an embodiment, the first display chamber camera 48 may be used to perform a retinal scan of an eye of the user 16. Such retinal scan is utilized as a biometric confirmation of the identity of the user 16. Further, eye tracking technology may be implemented to process the image signal to monitor the user 16 to determine whether the user 16 is attentive to content projected on the user video display 20. The image signal may also be monitored to detect unapproved objects within the display chamber 24, such as an tiny unapproved video display to give access to the user 16 to unauthorized content projected on such unapproved video display, or a tiny camera that may project the content the user video display 20. Additionally, the only light that would be expected to be in the display chamber 24 would come from the user video display 20. As the system 10 controls the displaying of content on the user video display 20, the system 10 may be operated to project no content from the user video display 20. In such a case, no light would be expected to be in the display chamber 24, and the first display chamber camera 48 may be used to detect light as "leaking in" from between the face 22 of the user 16 and the display pads 40. This could indicate that the user 16 is not properly wearing the personal display headset 12, that the user 16 has tampered with the display pads 40, or that unapproved content is originating within the display chamber 24.

In an embodiment, the first display chamber camera 48 may be used to perform a retinal scan of an eye of the user 16. Such retinal scan is utilized as a biometric confirmation of the identity of the user 16. Further, eye tracking technology may be implemented to process the image signal to monitor the user 16 to determine whether the user 16 is attentive to content projected on the user video display 20. Secondarily, the image signal may also be monitored to detect unapproved objects within the display chamber 24, such as a tiny unapproved video display to give access to the user 16 to unauthorized content projected on such unapproved video display, or a tiny camera that may project the content the user video display 20. Additionally, the only light that would be expected to be in the display chamber 24 would come from the user video display 20. As the system 10 controls the displaying of content on the user video display 20, the system 10 may be operated to project no content from the user video display 20. In such a case, no light would be expected to be in the display chamber 24, and the second display chamber camera 50 may be used to detect light as "leaking in" from between the face 22 of the user 16 and the display pads 40. This could indicate that the user 16 is not properly wearing the personal display headset 12, that the user 16 has tampered with the display pads 40, or that unapproved content is originating within the display chamber 24.

The personal display headset 12 may include a second display chamber camera 50 (as depicted in FIG. 4). The second display chamber camera 50 is disposed within the display chamber 24 facing away from the user 16 towards the user video display 20 to capture images of the user video display 20. The second display chamber camera 50 is configured to generate and transmit an image signal to the central processing unit 36. The central processing unit 36 is configured to receive the image signal from the second display chamber camera 50. The hardware/software and techniques for effecting such image signal generation, transmission and processing may be chosen from those which are well known to one of ordinary skill in the art. A low light camera would be appropriate.

The second display chamber camera 50 is used to capture and record images from the perspective of the user 16. The second display chamber camera 50 is intended to "see" what the user 16 sees. As such, this provides for the generation of a historical archive of what was actually projected on the user video display 20 and available for the user 16.

The personal display headset 12 may include a view camera 52. The view camera 52 is positioned to capture video images external to the user video display 20 in a direction facing away from user video display 20 and the face 22 of the user 16. The view camera 52 may be disposed opposite of the facing direction of the user video display 20. With the user video display 20 securely and properly affixed to the head 18 of the user 16, this is intended to generally track the direction in which the eyes of the user 16 would be looking straight ahead. The view camera 52 is configured to capture images (such as video images) in the form of image signals which may be then transmitted to and processed by the central processing unit 36. The signals as received by the view camera 52 is used to provide images of the vicinity of the user 16 which the view angle being controlled by movements of the head of the user 16. This may be used to capture images which may be processed by the central processing unit 36 to create a processed image signal which may be transmitted to the user video display 20. The user 16 is intended to view images of the processed image signal as displayed on the user video display 20. Such an arrangement intuitively allows the user 16 to make head movements to allow the user 16 to control the view as being displayed on the user video display 12. In addition, this is also anticipated to capture images of any unauthorized external occurrences around the user 16 (such as disallowed materials or even persons in close proximity to the user 16). While the view camera 52 is depicted as a single camera, the view camera 52 may be more than one camera, such as two cameras. It is contemplated that the separation of cameras would enable the related signals to be processed by the central processing unit 36 to determine depth perception. The hardware/software and techniques for effecting such image signal generation, transmission and processing may be chosen from those which are well known to one of ordinary skill in the art.

The input terminal 14 may include a video display 56. This may take the form of a computer monitor or display of the laptop type of computer for example. The video display 56 is configured to display images correlating to electrical signals from the central processing unit 36. For example, the video display 56 may be configured to project test questions. The user 16 may "view" the projected images on the video display 56 may controlling the view angle of the view camera 52 by positioning of the head 18 of the user 16. The view camera 52 is used to capture images of the projected test questions which in turn results in a derivative image of the video display 56 being displayed on the user video display 20.

As discussed above, the personal display headset 12 may have the second display chamber camera 50 to capture images of what is being project on the user video display 20. Where the personal display headset 12 is used in conjunction with the with the input terminal 14, the user 16 is intended to use the view camera 52 to capture images of the content being displayed on the video display 56. The generated image signals are transmitted to the central processing unit 36 for processing and transmission back to the user video display 20 which in turn is captured by the second display chamber camera 50. This generates yet another image signal that is received at the central processing unit 36 from the second display chamber camera 50.

Referring additionally to FIGS. 6A and 6B, the personal display headset 12 may further include headphones 60. The headphones 60 include first and second ear cups 66, 68, a first speaker 62 disposed within the first ear cup 66, and a second speaker 64 disposed within the second ear cup 68. The first and second speakers 62, 64 are configured to receive and play audio signals as transmitted from the central processing unit 36. Such an arrangement may be used to provide audio instructions to the user 16.

The headphones 60 further include a first internal microphone 74 disposed within the first ear cup 62, and a second internal microphone 76 disposed within the second ear cup 64. The first and second internal microphones 74, 76 are configured to capture sounds that may occur within the space between the ear of the user 16 and the interior of the first and second ear caps 62, 64. The captured sounds take the form of audio signals which may be then transmitted to and processed by the central processing unit 36. This processing may include filtering technology that may be used to filter sounds correlating to that which may be expected to be generated by the first and second speakers 62, 64. The hardware/software and techniques for effecting such audio signal generation, transmission and processing may be chosen from those which are well known to one of ordinary skill in the art. This arrangement is anticipated to capture and record unauthorized audio resources, such as may be introduced by the addition of an unapproved mini-speaker or earbud being used by the user 16, or tampering of the ear cup pads 70 to allow for hearing of external sounds.

The headphones 60 further include a first internal camera 78 disposed within the first ear cup 66, and a second internal camera 80 disposed within the second ear cup 68. The first and second internal cameras 78, 80 are configured to capture images from within interior of the first and second ear cups 62, 64 and pointed in a direction towards the respective ear canals of the user 16. The captured images take the form of image signals which may be then transmitted to and processed by the central processing unit 36. The hardware/software and techniques for effecting such image signal generation, transmission and processing may be chosen from those which are well known to one of ordinary skill in the art. A very low light camera would be appropriate as it is expected that virtually no light would be within the first and second ear cups 62, 64 during normal usage of the personal display headset 12. This arrangement is anticipated to capture and record unauthorized audio resources, such as may be introduced by the addition of an unapproved mini-speaker or earbud being used by the user 16. The captured images are also intended to detect light "leaking in" from between the ear cup pads 70 and the head 18 of the user 16. This would indicate that the user 16 is not properly wearing the personal display headset 12, and the possibility that the user 16 has attempted to access unauthorized audio resources or has tampered with the ear cup pads 70.

The headphones 60 may further include ear cup pads 70. The ear cup pads 70 are distributed about each of the first and second ear cups 66, 68 between the first and second ear cups 66, 68 and the head 18 of the user 16 for sealing the headphones 60 with the head 16 of the user 16. The ear cup pads 70 include ear cup pad sensors 72 sized and configured to detect contact between the headset 12 and the head 18 of the user 16. The ear cup pad sensors 72 may be pressure sensors. The ear cup pad sensors 72 are electronically connected to the central processing unit 36. In this regard, the central processing unit 36 may receive from the ear cup pad sensors 72 a signal indicating contact between the headphones 60 and the head 18 of the user 16. The hardware/software and techniques for effecting such signal generation, transmission and processing may be chosen from those which are well known to one of ordinary skill in the art. The goal of this arrangement is to seek to have the headphones 60 secured in place in a manner that does not allow for the possibility of any gap between the head 18 of the user 16 and the ear cup pad 70. Such a gap could be exploited to facilitate the user 16 to gain audio access to unauthorized resources external to the personal display headset 12 (i.e., the user 16 cheating by hearing disallowed resources either through a mini-speaker or earbud placed in the ear of the user 16 or external sounds).

It is contemplated that the personal display headset 12 as discussed above is intended to physically limit the ability of user 16 to hear anything outside of the software activities (such as testing, gambling, etc.) as audibly projected through the headphones 60. Such limitations are structured so as to seek to eliminate cheating during such activities through exposure to unauthorized audible resources.

The personal display headset 12 may be provided with a surround camera 58, which may take the form of a 360 degree camera. The surround camera 58 is configured to be facing away from the user 16 and slightly downward from the top of the head 18 of the user 16 (when personal display headset 12 is properly worn by the user 16). The surround camera 58 is configured to capture images (such as video images) in the form of image signals which may then be transmitted to and processed by the central processing unit 36. The signals as received by the surround camera 58 are used to provide images of the general vicinity or environment. This is anticipated to capture images of any unauthorized external occurrences around the user 16 (such as disallowed materials or even persons in close proximity to the user 16). The hardware/software and techniques for effecting such signal generation, transmission and processing may be chosen from those which are well known to one of ordinary skill in the art.

The personal display headset 12 may be provided with an external microphone 84. The external microphone 84 is configured to capture audible sounds external to the headphones 60 which may generate an audio signal which may be then transmitted to and processed by the central processing unit 36. This processing may include filtering technology that may be used to filter sounds correlating to that which may be expected to be generated by the first and second speakers 62, 64. The audio signal is used to provide a representation of sounds as occurring in the vicinity or environment of the user 16. The hardware/software and techniques for effecting such signal generation, transmission and processing may be chosen from those which are well known to one of ordinary skill in the art.

Occasional audio checks using the first and second speakers 62, 64 and the external microphone 84 may be used to verify that the external microphone 84 is on and picking up all external sounds. The external microphone 84 may also be utilized by the system 10 to enable voice commands by the user 16. In this regard, the external microphone 84 may be used to generate an audio signal of detected sounds, such as the voice of the user 16. This audio signal may be received by the central processing unit 36 and processed to recognize voice commands. As such the external microphone 84 may be a component of an input device to the system 10.

The input terminal 14 may include an input device 86. The input device 86 is used by the user 16 to interact with the system 10. The input device 86 may include a keyboard 88 and a mouse 90 as depicted, and may take the form of any number of other electronic devices, including hand-held controllers, trackballs, etc. The hardware/software and techniques for such input device and the related electronic and signal generation, transmission and processing may be chosen from those which are well known to one of ordinary skill in the art.

The system 10 may be used to limit the content that the user 16 is able to see as displayed on the user video display 20. As mentioned above, the view camera 52 is able to generate an image signal. With the user 16 positioned with the input terminal 14 in view of the view camera 52, an image signal is generated and transmitted to the central processing unit 36. The central processing unit 36 receives this image signal. This signal may be processed to enable the system 10 to recognize and identify the input terminal 14 (including components thereof) from within the image content representing the vicinity about the input terminal 14. This may be done though filtering video content of the image signal from the view camera 52 based upon the identified input terminal 14. The filtered video content may be represented as another image signal which is transmitted to the user video display 20. The user video display 20 displays the resultant filtered image of the input terminal 14. The hardware/software and techniques for such filtering and the related electronic and signal generation, transmission and processing may be chosen from those which are well known to one of ordinary skill in the art. In an embodiment, the input terminal 14 may be colored to be a very specific exterior color, such as a shade of pink. The filtering of the video content may include a process to detect that specific color, which is then used to identify the input terminal 14. Having identified the input terminal 14 from within the other imagery within the video content, the video content may be processed to only include the identified input terminal 14 while blocking or obscuring any other imagery about the input terminal 14. As such, this filtering may be used to effectively prevent the user 16 from being exposed to unauthorized visual resources that may be outside of the view of the displayed (and filtered) input terminal 14.

The input device 86 may be provided with terminal cameras 54. The terminal cameras 54 are configured to be facing towards the user 16 (when the user 16 is in an expected normal physical posture interacting with the input device 86). The terminal cameras 54 are configured to capture images (such as video images) which may be then transmitted to and processed by the central processing unit 36. The images as received by the terminal cameras 54 are used to provide a visual confirmation of the user 16 interacting with the personal display system 10 while wearing the personal display headset 12. This may additionally capture images of any unauthorized external occurrences around the user 16 (such as disallowed materials or even persons in close proximity to the user 16). The hardware/software and techniques for effecting such signal generation, transmission and processing may be chosen from those which are well known to one of ordinary skill in the art.

While two terminal cameras 54 are depicted in this embodiment, it is contemplated that only a single camera or more than two cameras may be implemented. By having at least two such terminal cameras 54, the image signals from such terminal cameras 54 may be processed to recognize 2D versus 3D images. The detection of a 3D image would eliminate the possibility of the video images being that of a deceptively presented image of a "user" (such as a video screen displaying a "fake" user as opposed to the actual user 16). In addition, where there are at least two terminal cameras 54, the terminal cameras 54 may be used to detect and analyze body movements, such as hand movements so as to represent various user inputs to the system 10.

The input terminal 14 may include biometric sensors that are configured to identify the user 16. In the embodiment depicted, the input terminal 14 includes a fingerprint sensor 92. The fingerprint sensor 92 is configured to detect and scan a person's finger so as to generate an electronic signal representative of the unique attributes of a fingerprint of the user 16. The electronic signal is then transmitted and processed by the central processing unit 36. This bio identification hardware eliminates impersonation in the context of various activities, such as test taking and online gambling. Furthermore this bio-identification hardware is used in conjunction with the terminal cameras 54 to track the bio-identified user 16 and the above described first internal camera 78, display pad sensors 42, the strap sensors 46 and ear cup sensors 72 to mitigate the possibility of use of an impersonator once the user 16 is identified during an initial sign in or log in process.

The personal display headset 12 may include a light source 92 disposed exterior to the display chamber 24 and sized and configured to selectively emit light. In this regard, the light source 92 may operate as a simple "flash". The light source 92 is disposed in electronic communication with the computer processing unit 36. The input terminal 14 may include a light sensor, such as in the form of the terminal cameras 54. The light sensor is sized and configured to detect light emissions from the light source 92. The light sensor is disposed in electronic communication with the computer processing unit 36. The light source 92 may be controlled in conjunction with the processing of the received image signals from the terminal cameras 54, such as through a periodic visual synch of the system 10 to make sure that neither components is a decoy and that each component is working properly.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A personal display headset for use upon a head of a user, the headset comprising:
   a user video display sized and configured to display images viewable by the user with the headset worn upon the head adjacent a face of the user;
   a display chamber defined by the user video display and the face of the user upon the headset being worn by the user; and
   headphones including:
      first and second ear cups for respective positioning about left and right ears of the user;
      a first speaker disposed within the first ear cup;
      a second speaker disposed within the second ear cup;
      a first internal microphone disposed within the first ear cup configured to capture sounds that may occur with a space between the left ear of the user and an interior of the first ear cup upon the headset being worn by the user; and a second internal microphone disposed within the second ear cup configured to capture sounds that may occur with a space between the right ear of the user and an interior of the second ear cup upon the headset being worn by the user.

2. The personal display headset of claim 1 further includes
a first internal camera disposed within the first ear cup; and
a second internal camera disposed within the second ear cup.

3. The personal display headset of claim 1 wherein the headphones further include ear cup pads, the ear cup pads are distributed about each of the first and second ear cups between the first and second ear cups and the head of the user for sealing the headphones with the head of the user, the ear cup pads include ear cup pad sensors sized and configured to detect contact between the headset and the head of the user.

4. The personal display headset of claim 3 wherein the ear cup pad sensors are pressure sensors.

5. The personal display headset of claim 1 further includes a view camera disposed external to the display chamber and facing generally away from the user and the user video display.

6. A personal display headset for use upon a head of a user, the headset comprising:
a user video display sized and configured to display images viewable by the user with the headset worn upon the head adjacent a face of the user;
a display chamber defined by the user video display and the face of the user upon the headset being worn by the user; and
headphones including:
first and second ear cups for respective positioning about left and right ears of the user;
a first speaker disposed within the first ear cup;
a second speaker disposed within the second ear cup;
a first internal camera disposed within the first ear cup configured to capture images from within interior of the first ear cup and pointed in a direction towards the left ear of the user upon the headset being worn by the user; and
a second internal camera disposed within the second ear cup configured to capture images from within interior of the second ear cup and pointed in a direction towards the right ear of the user upon the headset being worn by the user.

7. The personal display headset of claim 6 wherein the headphones further include ear cup pads, the ear cup pads are distributed about each of the first and second ear cups between the first and second ear cups and the head of the user for sealing the headphones with the head of the user, the ear cup pads include ear cup pad sensors sized and configured to detect contact between the headset and the head of the user.

8. The personal display headset of claim 7 wherein the ear cup pad sensors are pressure sensors.

9. The personal display headset of claim 6 further includes a view camera disposed external to the display chamber and facing generally away from the user and the user video display.

10. A personal display headset for use upon a head of a user, the headset comprising:
a user video display sized and configured to display images viewable by the user with the headset worn upon the head adjacent a face of the user;
a display chamber defined by the user video display and the face of the user upon the headset being worn by the user;
a first display chamber camera disposed within the display chamber facing away from the user to capture images of the user video display;
display pads distributed about the user video display between the user video display and the face of the user for sealing the display chamber with the face of the user; and
headphones including:
first and second ear cups;
a first speaker disposed within the first ear cup; and
a second speaker disposed within the second ear cup.

11. The personal display headset of claim 10 wherein the display pads include display pad sensors sized and configured to detect contact between the headset and the face of the user.

12. The personal display headset of claim 11 wherein the display pad sensors are pressure sensors.

13. The personal display headset of claim 10 further includes a second display chamber camera disposed within the display chamber facing away from the user video display towards the face of the user to capture images of the user.

14. The personal display headset of claim 10 further includes a view camera disposed external to the display chamber and facing generally away from the user and the user video display.

15. The personal display headset of claim 10 wherein the headphones further include ear cup pads, the ear cup pads are distributed about each of the first and second ear cups between the first and second ear cups and the head of the user for sealing the headphones with the head of the user, the ear cup pads include ear cup pad sensors sized and configured to detect contact between the headset and the head of the user.

16. The personal display headset of claim 15 wherein the ear cup pad sensors are pressure sensors.

17. A personal display headset for use upon a head of a user, the headset comprising:
a user video display sized and configured to display images viewable by the user with the headset worn upon the head adjacent a face of the user;
a display chamber defined by the user video display and the face of the user upon the headset being worn by the user;
a first display chamber camera disposed within the display chamber facing away from the user to capture images of the user video display;
display pads distributed about the user video display between the user video display and the face of the user for sealing the display chamber with the face of the user, the display pads including display pad sensors sized and configured to detect contact between the headset and the face of the user; and
headphones including:
first and second ear cups;
ear cup pads distributed about each of the first and second ear cups between the first and second ear cups and the head of the user for sealing the headphones with the head of the user, the ear cup pads including ear cup pad sensors sized and configured to detect contact between the headset and the head of the user;
a first speaker disposed within the first ear cup; and
a second speaker disposed within the second ear cup.

17

18. The personal display headset of claim 17 further includes a second display chamber camera disposed within the display chamber facing away from the user video display towards the face of the user to capture images of the user.

19. The personal display headset of claim 17 further includes a view camera disposed external to the display chamber and facing generally away from the user and the user video display.

20. A personal display system for use upon a head of a user, the system comprising:
- a computer processing unit;
- a headset including;
  - a user video display sized and configured to display images viewable by the user with the headset worn upon the head adjacent a face of the user, the user video display being in electronic communication with the computer processing unit;
  - a display chamber defined by the user video display and the face of the user upon the headset being worn by the user;
  - a view camera disposed external to the display chamber and facing generally away from the user video display, the view camera being disposed in electronic communication with the computer processing unit; and
  - a light source disposed exterior to the display chamber and sized and configured to selectively emit light, the light source being in electronic communication with the computer processing unit; and
- a terminal including:
  - a terminal display;
  - an input device in electronic communication with the computer processing unit configured to receive input from the user for transmission to the computer processing device; and
  - a light sensor sized and configured to detect light emissions from the light source, the light sensor being in electronic communication with the computer processing unit.

21. The personal display system of claim 20 wherein the input device includes a keyboard.

22. The personal display system of claim 20 wherein the light sensor is a video camera.

23. A method of a user interacting with an input terminal, the method comprising:
a) providing a headset to the user, the headset including:
  - a user video display sized and configured to display images viewable by the user with the headset worn upon the head adjacent a face of the user, the user video display being in electronic communication with a computer processing unit;
  - a display chamber defined by the user video display and the face of the user upon the headset being worn by the user;
  - display pads distributed about the user video display between the user video display and the face of the user for sealing the display chamber with the face of the user, the display pads including display pad sensors sized and configured to detect contact between the headset and the face of the user; and
  - a view camera disposed external to the display chamber and facing generally away from the user video display, the view camera being disposed in electronic communication with the computer processing unit;
b) providing the input terminal including:

18

- an input device in electronic communication with the computer processing unit configured to receive input from the user for transmission to the computer processing unit; and
  - a terminal camera in electronic communication with the computer processing unit;
c) receiving, at the central processing unit from the display pad sensors, a signal indicating contact between the headset and the face of the user;
d) receiving, at the central processing unit from the terminal camera, a video image of the headset on the user;
e) receiving, at the central processing unit from the view camera, a video image of the input terminal; and
f) displaying on the user video display the received video image of the input terminal.

24. The method of claim 23 further includes:
g) receiving, at the central processing unit, an input by the user via the input device.

25. The method of claim 23 wherein the headset further includes a first display chamber camera disposed within the display chamber facing away from the user video display towards the face of the user to capture images of the user, the method further includes:
h) receiving, at the central processing unit from the first display chamber camera, a video image of the user.

26. The method of claim 23 wherein the headset further includes a second display chamber camera disposed within the display chamber facing away from the user to capture images of the user video display, the method further includes:
i) receiving, at the central processing unit from the second display chamber camera, a video image of the input terminal as displayed on the user video display.

27. The method of claim 23 wherein the headset further includes first and second ear cups, a first speaker disposed within the first ear cup, a second speaker disposed within the second ear cup, a first internal microphone disposed within the first ear cup, a second internal microphone disposed within the second ear cup, a first internal microphone disposed within the first ear cup, and a second internal microphone disposed within the second ear cup, the method further includes:
j) receiving, at the central processing unit from each of the first and second internal microphones, an audio signal respectively related to sounds from within the first and second ear cups.

28. The method of claim 23 wherein the headset further includes first and second ear cups, a first speaker disposed within the first ear cup, a second speaker disposed within the second ear cup, a first internal microphone disposed within the first ear cup, a second internal microphone disposed within the second ear cup, a first internal camera disposed within the first ear cup, and a second internal camera disposed within the second ear cup, the method further includes:
k) receiving, at the central processing unit from each of the first and second internal cameras, a video image respectively related to the first and second ear cups.

29. The method of claim 23 wherein the headset further includes first and second ear cups, a first speaker disposed within the first ear cup, a second speaker disposed within the second ear cup, and ear cup pads distributed about each of the first and second ear cups between the first and second ear cups and the head of the user for sealing the headphones with the head of the user, the ear cup pads include ear cup pad sensors sized and configured to detect contact between the headset and the head of the user, the method further includes:
 1) receiving, at the central processing unit from each of the ear cup pad sensors, signals indicating contact between the headset and the head of the user.

30. A method of a user interacting with an input terminal, the input terminal including an input device and a terminal display, the method comprising:
 a) providing a headset to the user, the headset including:
  a user video display sized and configured to display images viewable by the user with the headset worn upon the head adjacent a face of the user, the user video display being in electronic communication with a computer processing unit;
  a display chamber defined by the user video display and the face of the user upon the headset being worn by the user; and
  a view camera disposed external to the display chamber and facing generally away from the user video display, the view camera being disposed in electronic communication with the computer processing unit;
 b) providing the input terminal including;
  an input device in electronic communication with the computer processing unit configured to receive input from the user for transmission to the computer processing unit; and
  a terminal camera in electronic communication with the computer processing unit;
 c) receiving, at the central processing unit from the terminal camera, a video image of the headset on the user;
 d) receiving, at the central processing unit from the view camera, a video image of the input terminal;
 e) identifying the input terminal in the received video image from the view camera;
 f) filtering video content of the video image from the view camera based upon the identified input terminal; and
 g) displaying on the user video display the filtered image of the input terminal.

31. The method of claim 30 wherein the input terminal is a first color, the step of identifying the input terminal is based upon detection of the first color.

32. The method of claim 30 wherein the input terminal includes a terminal camera in electronic communication with the computer processing unit, the method further includes the step of receiving at the central processing unit from the terminal camera a video image of the headset on the user.

* * * * *